(12) United States Patent
Babin et al.

(10) Patent No.: US 6,869,276 B2
(45) Date of Patent: Mar. 22, 2005

(54) NOZZLE SEAL FOR AN INJECTION MOLDING APPARATUS

(75) Inventors: Denis Babin, Georgetown (CA); George Olaru, Toronto (CA)

(73) Assignee: Mold-Masters Limited (CA)

( * ) Notice: Subject to any disclaimer, the term of this patent is extended or adjusted under 35 U.S.C. 154(b) by 0 days.

(21) Appl. No.: 10/262,967

(22) Filed: Oct. 3, 2002

(65) Prior Publication Data

US 2003/0082264 A1 May 1, 2003

Related U.S. Application Data

(60) Provisional application No. 60/328,830, filed on Oct. 15, 2001.

(30) Foreign Application Priority Data

Oct. 3, 2001 (CA) .............................. 2358187

(51) Int. Cl.[7] .............................. B29C 45/20
(52) U.S. Cl. .................. 425/549; 264/328.15
(58) Field of Search ................ 425/549; 264/328.15

(56) References Cited

U.S. PATENT DOCUMENTS

| | | |
|---|---|---|
| 4,013,393 A | 3/1977 | Gellert |
| 4,043,740 A | 8/1977 | Gellert |
| 4,053,271 A | 10/1977 | Gellert |

(List continued on next page.)

FOREIGN PATENT DOCUMENTS

| | | |
|---|---|---|
| CA | 2190569 | 5/1996 |
| DE | 100 08 722 A1 | 8/2001 |
| EP | 0 590 677 A1 | 6/1994 |
| EP | 1 321 274 A1 | 6/2003 |
| GB | 1 540 698 | 2/1979 |
| WO | WO 00/48814 | 8/2000 |
| WO | WO 01/28750 A1 | 4/2001 |
| WO | WO 03/086734 A1 | 10/2003 |

OTHER PUBLICATIONS

Daniel Frenkler and Henryk Zawistowski—RAPRA Technology Ltd., "Hot Runners in Injection Moulds", 2001.
Husky Injection Molding Systems, S.A. 750 Series.
J.D. Robinson, "Gating and Cooling Techniques for Polypropylene", Plastics. Aug. 1965, pp. 47–51.
Redacted letter and attached figure addressed to Mold Masters Limited from the representative of Mr. Maurizio Bazzo dated Dec. 21, 2001.

*Primary Examiner*—Tim Heitbrink
(74) *Attorney, Agent, or Firm*—Sterne, Kessler, Goldstein & Fox PLLC

(57) ABSTRACT

A nozzle for an injection molding apparatus is provided. The nozzle includes a nozzle body, a heater and a first gap seal surface. The nozzle body defines a nozzle body melt passage, that is adapted to be downstream from and in fluid communication with a melt source, and upstream from and in fluid communication with a gate into a mold cavity in a mold component. The heater is thermally connected to the nozzle body for heating melt in the nozzle body melt passage. The first gap seal surface is positioned on a structure that is connected at least indirectly to the nozzle body. The first gap seal surface is adapted to be separated by a gap with respect to a second gap seal surface on the mold component. The gap is sized to inhibit the flow of melt between the first gap seal surface and the second gap seal surface.

44 Claims, 14 Drawing Sheets

U.S. PATENT DOCUMENTS

| | | | |
|---|---|---|---|
| 4,173,448 A | 11/1979 | Rees et al. | |
| 4,268,240 A | 5/1981 | Rees et al. | |
| 4,268,241 A | 5/1981 | Rees et al. | |
| 4,279,588 A | 7/1981 | Gellert | |
| 4,286,941 A | 9/1981 | Gellert | |
| 4,662,837 A | 5/1987 | Anderson | |
| 4,950,154 A | 8/1990 | Moberg | |
| 5,208,052 A | 5/1993 | Schmidt et al. | |
| 5,299,928 A | 4/1994 | Gellert | |
| 5,324,191 A | 6/1994 | Schmidt | |
| 5,421,716 A | 6/1995 | Gellert | |
| 5,443,381 A * | 8/1995 | Gellert | 425/549 |
| 5,474,439 A | 12/1995 | McGrevy | |
| 5,492,467 A | 2/1996 | Hume et al. | |
| 5,545,028 A | 8/1996 | Hume et al. | |
| 5,554,395 A | 9/1996 | Hume et al. | |
| 5,658,604 A | 8/1997 | Gellert et al. | |
| 5,674,439 A | 10/1997 | Hume et al. | |
| 5,736,171 A | 4/1998 | McGrevy | |
| 5,795,599 A | 8/1998 | Gellert | |
| 5,820,899 A * | 10/1998 | Gellert et al. | 425/549 |
| 5,879,727 A | 3/1999 | Puri | |
| 5,885,628 A * | 3/1999 | Swenson et al. | 425/549 |
| 5,894,025 A | 4/1999 | Lee et al. | |
| 5,925,386 A | 7/1999 | Moberg | |
| 5,980,237 A | 11/1999 | Swenson et al. | |
| 6,022,210 A | 2/2000 | Gunther | |
| 6,030,202 A * | 2/2000 | Gellert et al. | 425/549 |
| 6,164,954 A | 12/2000 | Mortazavi et al. | |
| 6,245,278 B1 | 6/2001 | Lausenhammer et al. | |
| 6,254,377 B1 | 7/2001 | Kazmer et al. | |
| 6,261,084 B1 | 7/2001 | Schmidt | |
| 6,264,460 B1 | 7/2001 | Wright et al. | |
| 6,287,107 B1 | 9/2001 | Kazmer et al. | |
| 6,394,785 B1 * | 5/2002 | Ciccone | 425/549 |
| 6,428,305 B2 | 8/2002 | Jenko | |
| 2003/0118688 A1 | 6/2003 | Bazzo et al. | |
| 2003/0180412 A1 | 9/2003 | Fong | |

* cited by examiner

NOZZLE SEAL FOR AN INJECTION MOLDING APPARATUS

This application is a provisional application of 60/328,830 filed Oct. 15, 2001.

FIELD OF THE INVENTION

This invention relates to an injection molding apparatus, and more particularly to a seal between a nozzle and a mold component in an injection molding apparatus.

BACKGROUND OF THE INVENTION

A hot runner injection molding apparatus typically includes nozzles that are heated to maintain melt therein at a controlled temperature. The nozzles are typically in contact with a mold component that defines one or more mold cavities. The mold cavities in the mold component are filled with melt that first passes through the nozzles. The mold component is then typically cooled in order to solidify the melt in the mold cavities, thus forming a plurality of molded parts, which are then ejected from the mold cavities.

Because the nozzles are typically heated, and the mold component is cooled for at least a portion of an injection molding cycle, it is desirable to have a relatively low heat transfer from the nozzles into the mold component. Many nozzle constructions have been proposed in the past to address this issue.

An example of such a nozzle construction is shown in U.S. Pat. No. 5,554,395, to Hume et al. The '395 patent teaches a multi-piece nozzle tip assembly including a tip piece, a tip surrounding piece and a resilient element. The resilient element is provided between the tip piece and the mold component, to inhibit melt leakage therepast. However, heat can be lost from the tip piece through the resilient element and into the mold component. In particular, the heat losses occur near the downstream end of the tip piece, where control over the temperature of the melt is particularly important.

Thus, there is a continuing need for new nozzle constructions that have further improved heat transfer efficiency.

SUMMARY OF THE INVENTION

In a first aspect, the invention is directed to a nozzle for an injection molding apparatus, comprising a nozzle body, a heater and a first gap seal surface. The nozzle body defines a nozzle body melt passage, that is adapted to be downstream from and in fluid communication with a melt source, and upstream from and in fluid communication with a gate into a mold cavity in a mold component. The heater is thermally connected to the nozzle body for heating melt in the nozzle body melt passage. The first gap seal surface is positioned on a structure that is connected at least indirectly to the nozzle body. The first gap seal surface is adapted to be separated by a gap with respect to a second gap seal surface on the mold component. The gap is sized to inhibit the flow of melt between the first gap seal surface and the second gap seal surface.

In a second aspect, the invention is directed to an injection molding apparatus incorporating the nozzle described above.

DESCRIPTION OF THE DRAWINGS

For a better understanding of the present invention and to show more clearly how it may be carried into effect, reference will now be made by way of example to the accompanying drawings, in which.

DESCRIPTION OF THE PREFERRED EMBODIMENT

Figure 1:
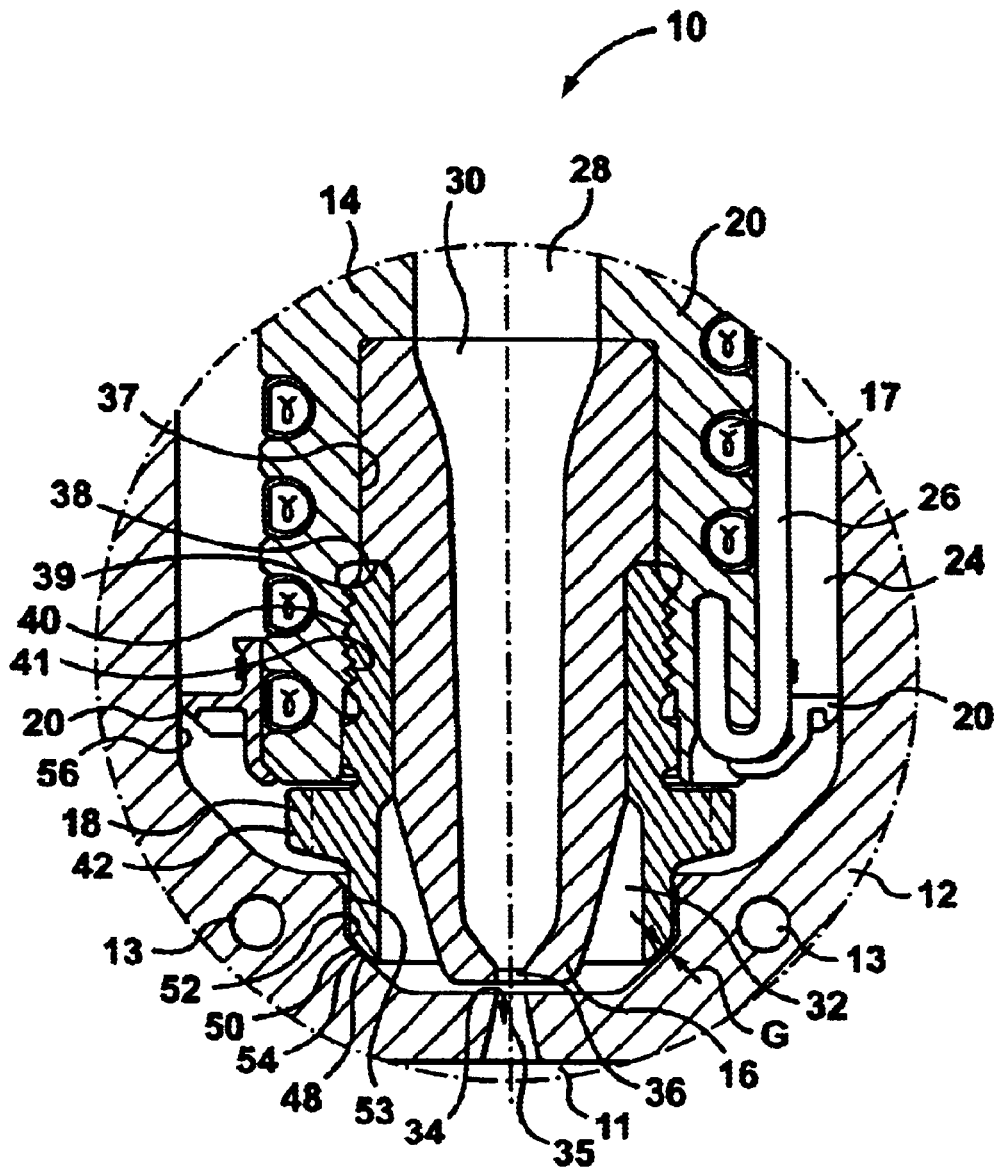
FIG. 1 is a sectional view of a portion of a nozzle in accordance with a first embodiment of the present invention.

Reference is made to FIG. 1, which shows a nozzle 10, in accordance with a first embodiment of the present invention. Nozzle 10 is for transferring melt from a runner in a manifold in a hot runner injection molding apparatus to a mold cavity 11 in a mold component 12. Mold cavity cooling channels 13 may optionally be included in mold component 12.

Nozzle 10 includes a nozzle body 14, a tip 16, and a heater 17 and may include a tip surrounding piece 18, an alignment piece 20 and a thermocouple 26. The nozzle body 14 has a body melt passage 28 that passes therethrough.

The heater 17 may be any suitable kind of heater, such as a resistive wire heater, or a sleeve heater, as long as it is thermally connected to the nozzle body 14, i.e. the heater 17 is connected such that heat is transferable from the heater 17 to the nozzle body 14. For example, the heater 17 may wrap around the nozzle body 14 in a groove on the outer surface of the nozzle body 14.

The tip 16 may be removably connected to the nozzle body 14. The tip 16 defines a tip melt passage 30 therethrough that is downstream from and in fluid communication with the body melt passage 28. The tip melt passage 30 may exit from tip 16 into a chamber 32. A gate 34 transfers melt from the chamber 32 into the mold cavity 11.

Melt passes from a melt source, through one or more runners in a runner component such as a manifold, through the nozzle body melt passage 28, through the tip melt passage 30, through the chamber 32, through the gate 34 and finally into the mold cavity 11. The centre of the gate 34 defines an axis 35, which is parallel to the direction of flow of melt through gate 34, into the mold cavity 11.

The exit from the tip melt passage into the chamber 32 is shown at 36. Exit 36 may be concentric with respect to axis 35, as shown in FIG. 1.

Because the melt flows through the tip 16, the tip 16 can be used to transfer heat from the heater 17 to the melt. To facilitate the heat transfer, the tip 16 is preferably made from a thermally conductive material, such as Beryllium-Copper.

Because of the melt flow through tip 16, the tip 16 may be exposed to a highly abrasive environment, and it may be desirable to make the tip 16 from a wear resistant material. An example of a material that is both thermally conductive and wear resistant is Tungsten Carbide. The tip 16 may be made in accordance with the teachings in U.S. Pat. No. 5,658,604 (Gellert et al.), which is hereby incorporated by reference and which discloses the construction of a nozzle tip using Tungsten Carbide.

The tip 16 may be positioned within a bore 37 in the nozzle body 14. Depending on the material selected for the tip 16, a threaded portion can be relatively difficult to machine. Furthermore, such a threaded portion can be brittle and subject to premature failure, depending on the material of manufacture for the tip 16. Thus, by making the tip 16 threadless, a greater number of materials are available for its manufacture.

Furthermore, by making the tip 16 threadless, some cost of manufacture is saved for the tip 16 and correspondingly for the nozzle body 14, relative to a threaded tip.

The tip surrounding piece 18 may retain the tip 16 in place in the nozzle body 14. The tip surrounding piece 18 may include a jam surface 38 which abuts a shoulder 39 on the tip 16 to retain the tip 16 in place. The jam surface 38 and the shoulder 39 may cooperate to form a mechanical seal.

The tip surrounding piece 18 may be removably attachable to the nozzle body 14. For example, the tip surrounding piece 18 may include a tip surrounding piece threaded portion 40 for mating with a corresponding nozzle body threaded portion 41 on the nozzle body 14. The threaded portion 40 as shown in FIG. 1 is an external thread, however, it is alternatively possible for the tip surrounding piece to include an internal thread to mate with an external thread on the nozzle body 14.

The tip surrounding piece 18 may also include a tool engagement portion 42, for receiving a tool (not shown), for the installation and removal of the tip surrounding piece 18 with respect to the nozzle body 14.

Figure 2:
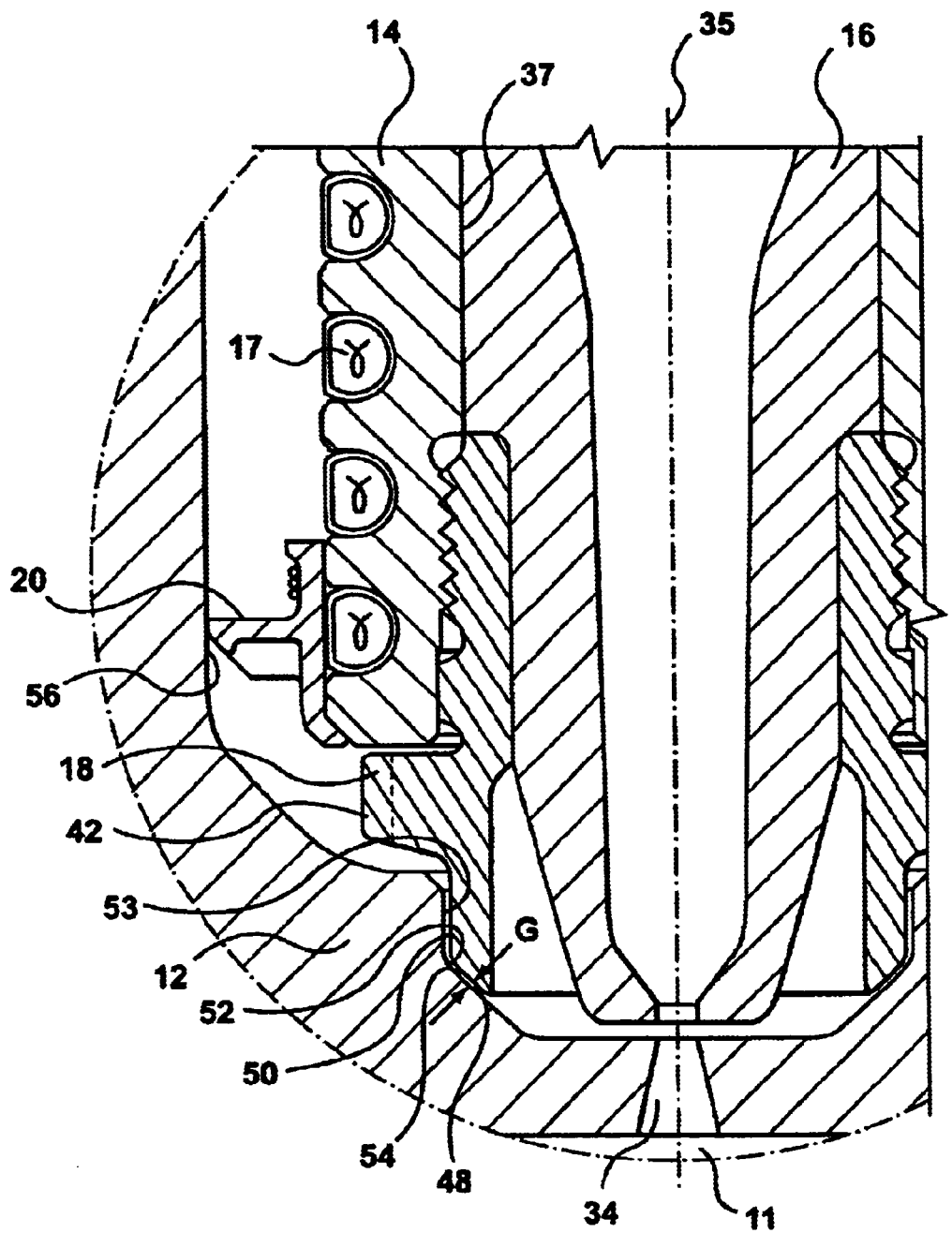
FIG. 2 is a magnified view of a sealing portion of the nozzle shown in FIG. 1.

A gap seal 48 may be formed by the tip surrounding piece 18 in cooperation with the mold component 12, as shown more clearly in FIG. 2. More specifically, a tip surrounding piece sealing surface 50 on the tip surrounding piece 18 may cooperate with a mold component sealing surface 52 on the mold component 12 to form the gap seal 48. The tip surrounding piece sealing surface 50 may be an outer surface on the tip surrounding piece 18, and the mold component sealing surface 52 may be the wall of the nozzle well, which is shown at 53 The tip surrounding piece sealing surface 50 and the mold component sealing surface 52 are separated from each other by a gap G. The tip surrounding piece sealing surface 50 may be referred to as the first gap seal surface 50, and the mold component sealing surface 52 may be referred to as the second gap seal surface 52.

Due to the viscosity of the melt in the chamber 32, the proximity of the first tip surrounding piece sealing surface 50 and the mold component sealing surface 52 inhibits melt from flowing between the first tip surrounding piece sealing surface 50 and the tip sealing surface 52. Thus, the gap G, in conjunction with the viscosity of the melt, acts as a seal.

The Gap G may be less than approximately 0.07 mm if it the only seal and is not combined with a mechanical seal. If the gap seal 48 is used in combination with a mechanical seal, the gap G may optimally be approximately 0.15 mm, or may be less than approximately 0.25 mm. It will be noted that the gap G required to inhibit the flow of melt is dependent on the specific molding application. The rheological properties of the melt at the injection temperature, such as its viscosity, determine the maximum gap G that provides the desired seal.

An advantage to including the gap seal 48 is that the manufacturing tolerances for sealing surfaces 50 and 52 are less demanding, relative to a typical mechanical sealing portion. A further advantage is that because melt does not pass through the gap seal 48, an air space 54 is maintained between the tip surrounding piece 18 and the mold component 12. The air space 49 provides an insulative layer to reduce heat transfer between the tip surrounding piece 18, and from the entire nozzle 10 in general, into the mold component 12.

To further reduce heat losses from the tip surrounding piece 18 and from the nozzle 10 in general into the mold component 12, the tip surrounding piece 18 may be made from a material that has a thermal conductivity that is lower than that of the material for the tip 16, depending on the specific requirements of the molding application.

The tip surrounding piece 18 may alternatively be made from a material that has a thermal conductivity that is similar to that of the nozzle tip 16. Because the tip surrounding piece 18 may be positioned between a portion of the heater 17 and the tip melt passage 30, as shown in FIG. 1, it may be advantageous to make the tip surrounding piece 18 from a material that has a thermal conductivity that is generally equal to that of the tip 16, to improve heat transfer between the heater 17 and the tip melt passage 30.

Because the melt that contacts the tip surrounding piece 18 is generally slower moving than the melt flowing through the tip 16, the tip surrounding piece 18 may be made from a material that is less wear resistant than that of the tip 16. Accordingly, the tip surrounding piece 18 may be made from a material that is relatively easily machined with threads.

Referring to FIG. 1, the alignment piece 20 may be included to align the nozzle 10 with respect to the gate 34 in molding applications where such alignment is important. The alignment piece 20 may be positioned between the nozzle body 14 and a bore 56 in the mold component 12. The bore 56 includes therein, the nozzle well 53. The alignment piece 20 may be positioned between the mold component 12 and any other suitable component of the nozzle 10, instead of the nozzle body 10.

The alignment piece 20 may be made from a material that has a lower thermal conductivity than that of the nozzle portion with which it is in contact, which is in this case, the nozzle body 14. For example, the alignment piece 20 may be made from tool steel, titanium, H13, or any other suitable material. It is alternatively possible for the alignment piece 20 to be integrally formed into the nozzle body 14, or into any other suitable portion of the nozzle 10, such as the tip surrounding piece 18.

Figure 3A:
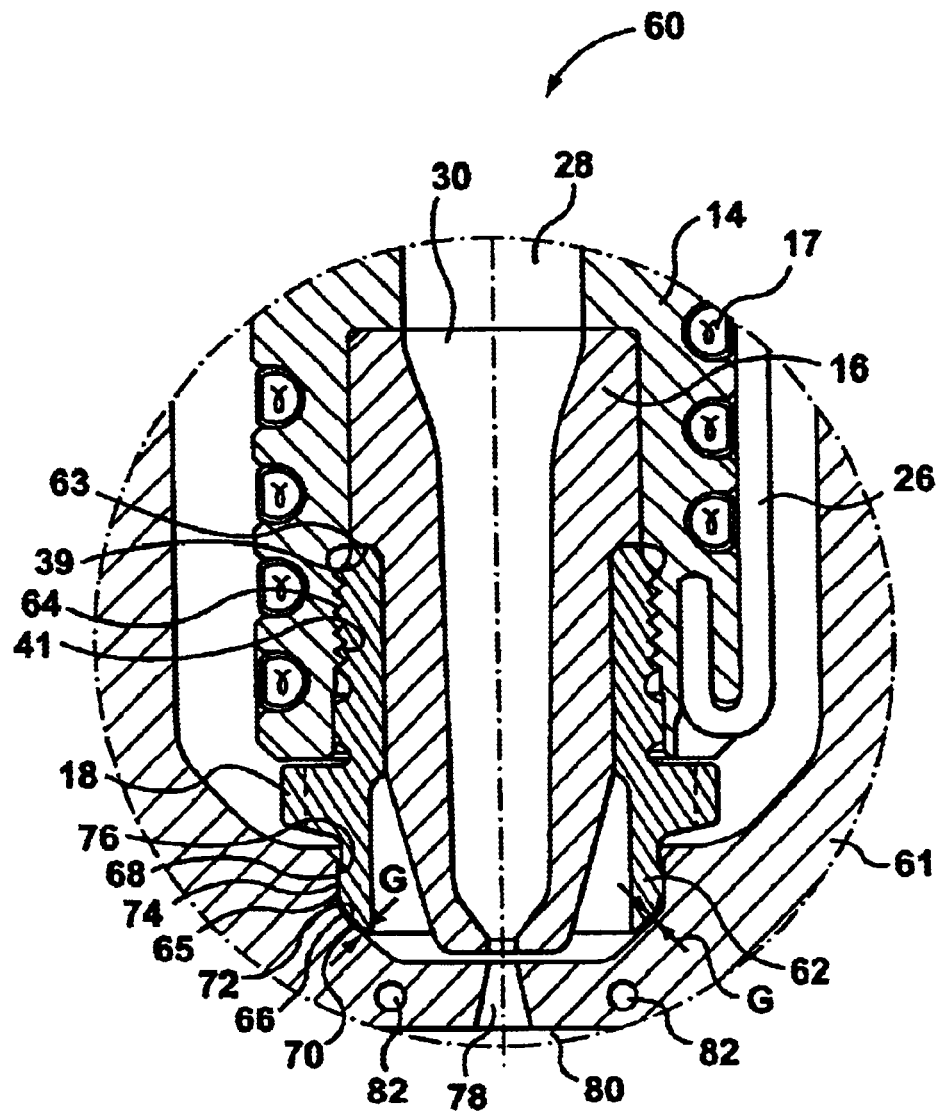
FIG. 3a is a sectional view of a portion of a nozzle in accordance with a second embodiment of the present invention.

Reference is made to FIG. 3a, which shows a nozzle 60 in accordance with a second embodiment of the present invention, in combination with a mold component 61.

Nozzle 60 is similar to nozzle 10 (FIG. 1), and includes the nozzle body 14, the tip 16, and the heater 17, and may include a tip surrounding piece 62 and a thermocouple 26. The tip surrounding piece 62 may be similar to the tip surrounding piece 18 (FIG. 1), and may have a jam surface 63 thereon which cooperates with the shoulder 39 on the tip 16 to retain the tip 16 in place in the nozzle body 14.

The tip surrounding piece 62 may include a tip surrounding piece threaded portion 64 that cooperates with the threaded portion 41 on the nozzle body 14, so that the tip surrounding piece 62 is removably attached to the nozzle body 14.

Figure 3B:
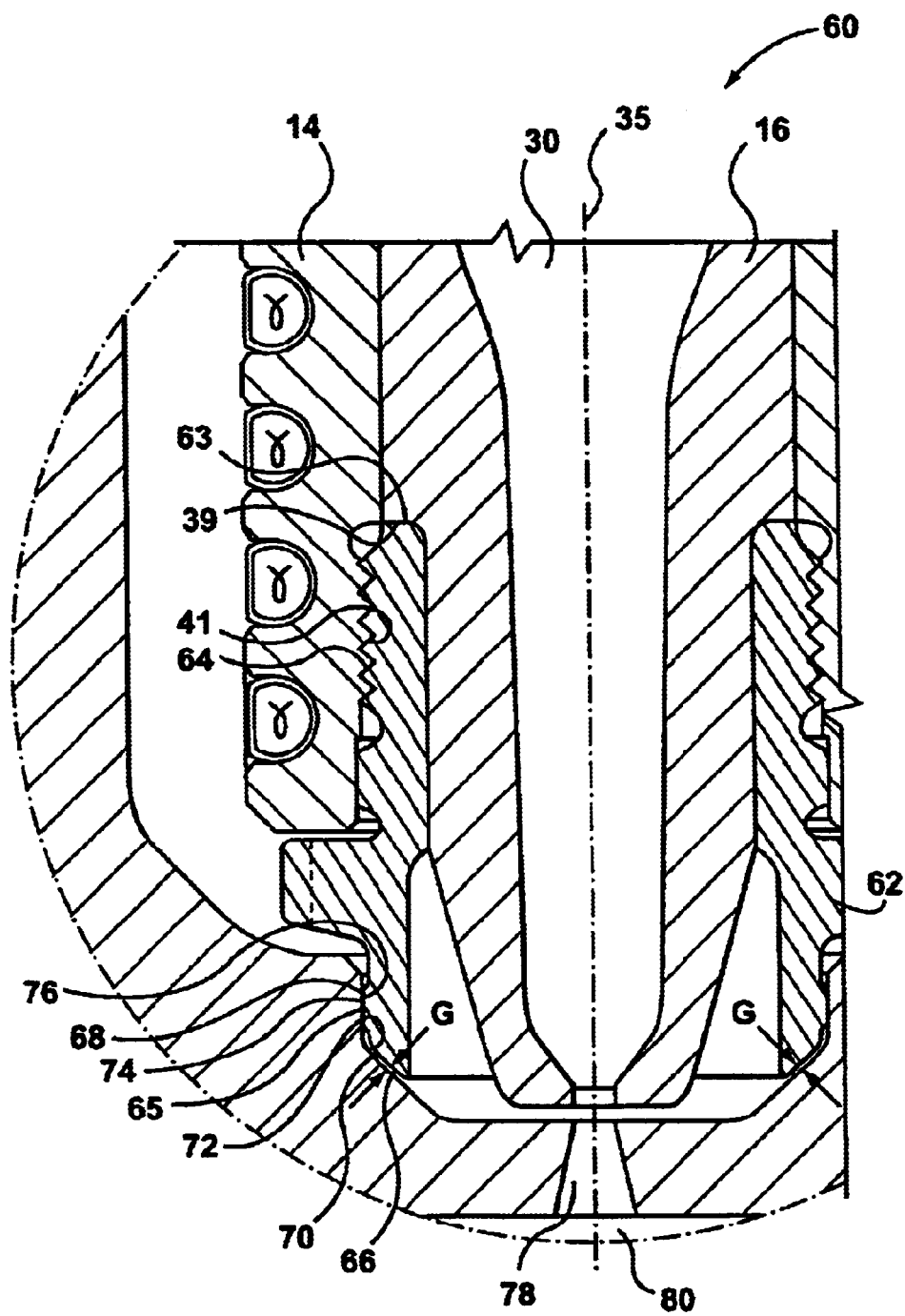
FIG. 3b is a magnified view of a sealing portion of the nozzle shown in FIG. 2.

The tip surrounding piece 62 cooperates with the mold component 61 to form a multi-portion seal 65 therebetween. The multi-portion seal 65 includes a gap seal 66 and also includes a second seal 68, which may be, for example, a mechanical seal, that is adjacent the gap seal 66. The gap seal 66 may be similar to the gap seal 48 (FIG. 1), and is formed by the cooperation of a first tip surrounding piece sealing surface 70 on the tip surrounding piece 62, with a first mold component sealing surface 72 on the mold component 61. The first tip surrounding piece sealing surface 70 and the first mold component sealing surface 72 are separated by the gap G, as shown more clearly in FIG. 3b. The first tip surrounding piece sealing surface 70 and the first mold component sealing surface 72 may be referred to as the first gap seal surface 70 and the second gap seal surface 72, respectively.

Because of the presence of the second seal 68, the gap G, in the embodiment shown in FIG. 3a may optimally be approximately 0.15 mm, and may be less than approximately 0.25 mm.

The second seal 68 may also be referred to as a supplementary seal 68, and is formed by the cooperation of a second tip surrounding piece sealing surface 74 on the tip surrounding piece 62, with a second mold component sealing surface 76 on the mold component 61. The sealing surfaces 74 and 76 may contact each other, as shown in FIG. 3a. The second tip surrounding piece sealing surface 74 and a second mold component sealing surface 76 may be referred to as the first supplementary seal surface 74 and the second supplementary seal surface 76 respectively.

The second seal 68 may be positioned behind the gap seal 66 with respect to the chamber 32, so that melt is exposed to the gap seal 66 before the second seal 68.

Because of the presence of the gap seal 66, the surface area of contact between the tip surrounding piece 62 and the mold component 61 along the sealing surfaces 74 and 76, is smaller than would be required if the second seal 68 acted alone to seal against melt leakage therepast. Thus, the heat transfer from the tip surrounding piece 62 and from the nozzle 60 in general, into the mold component 61 is reduced accordingly.

In addition to forming the second seal 68, the second sealing surfaces 74 and 76 may cooperate to align the nozzle 10 with respect to the gate, which is shown at 78. This applies particularly in the case, as shown in FIG. 3a, where the sealing surfaces 74 and 76 are substantially vertical surfaces. However, the second sealing surfaces 74 and 76 may be inclined instead of being vertical, and may still be adapted to align the nozzle 60 with respect to the gate 78.

Referring to FIG. 3a, the mold component 61 may be similar to the mold component 12 (FIG. 1), and defines a plurality of mold cavities 80, each of which has at least one gate 78 leading thereto. The mold component 61 may include cooling channels 82 for cooling of melt in the mold cavities 80.

Figure 3C:
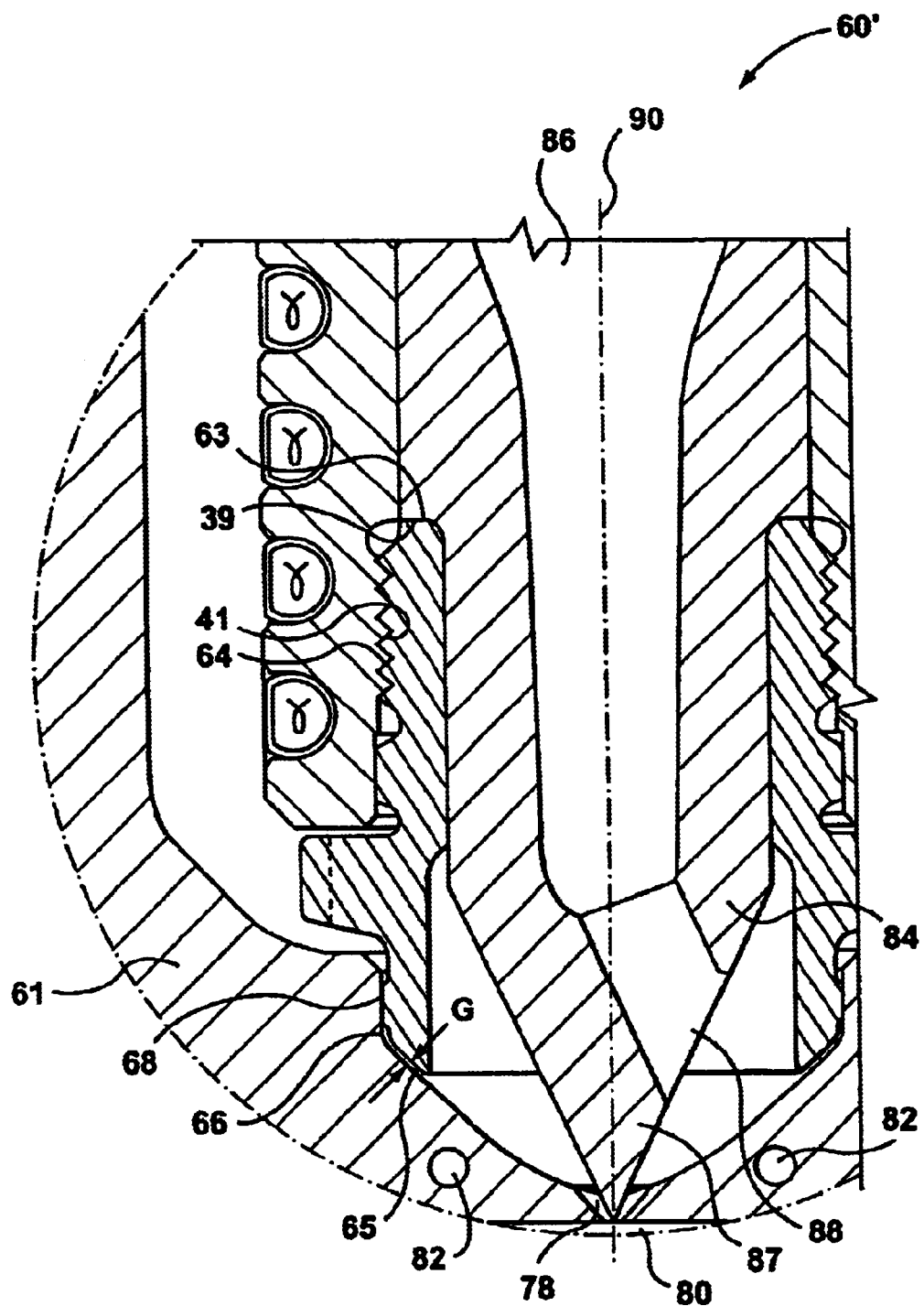
FIG. 3c is a sectional view of a portion of a nozzle in accordance with a third embodiment of the present invention.

Reference is made to FIG. 3c, which shows a variant 60' of the embodiment shown in FIG. 3a. In the nozzle 60', a tip 84 replaces the tip 16 (FIG. 3a). The tip 84 may be similar to the tip 16 (FIG. 3a) and may define a tip melt passage 86 therethrough. However, the tip 84 includes a torpedo portion 87, and the tip melt passage 86 may have an exit 88 that is off-centre from the axis of the gate 78, which is shown at 90.

It will be noted that the tip 84 may also replace the tip 16 in the embodiment shown in FIGS. 1 and 2.

Figure 4:
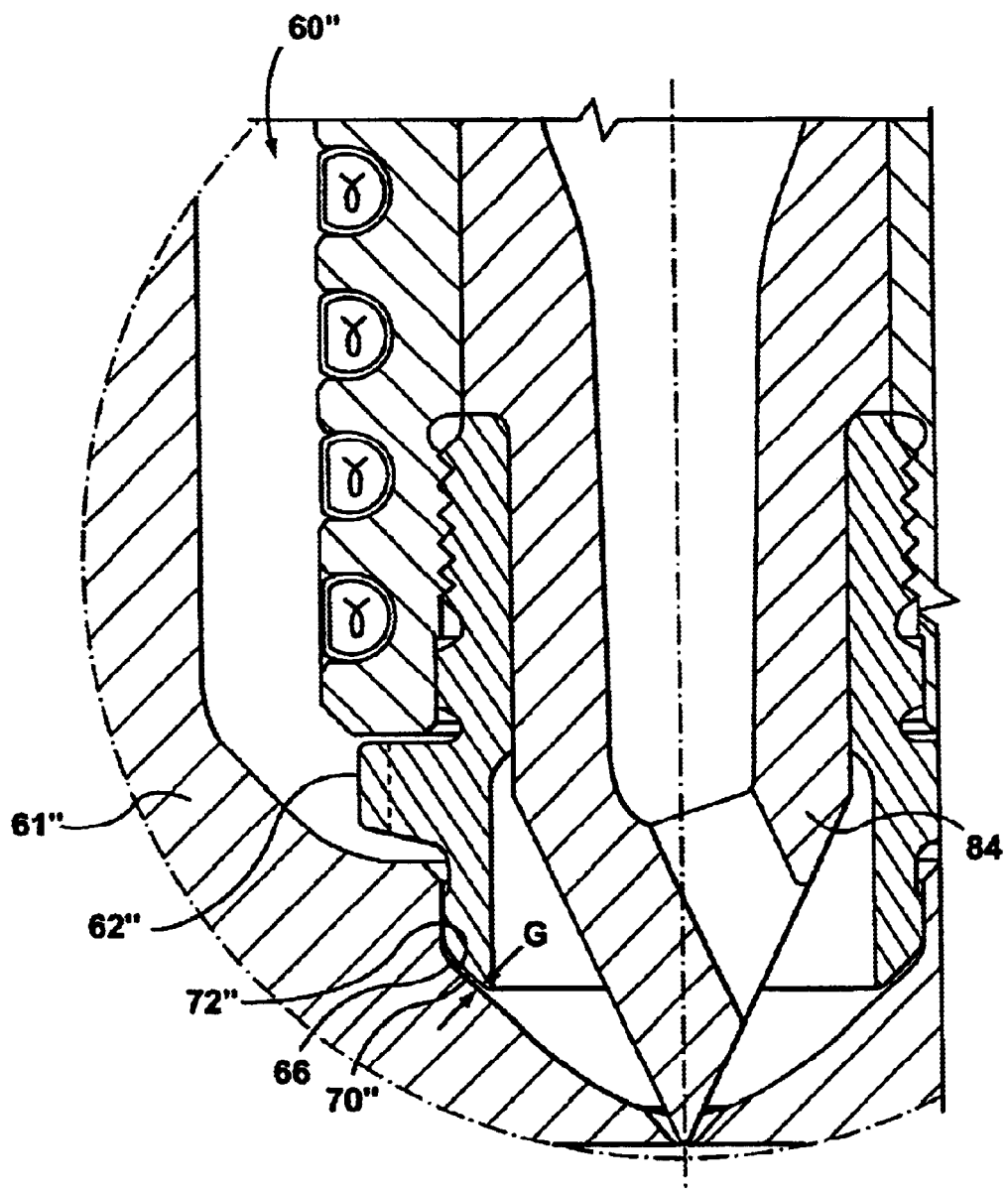
FIG. 4 is a sectional view of a portion of a nozzle in accordance with a fourth embodiment of the present invention.

Reference is made to FIG. 4, which shows another variant 60" of the embodiment shown in FIG. 3a. In the variant shown in FIG. 4, the tip 84 replaces the tip 16 (FIG. 3a). The items shown in FIG. 4 are similar to those in FIG. 3a, except as follows. A gap seal 66" is formed which is similar to the gap seal 66 (FIG. 3a), except that the gap seal 66" is formed between a first tip surrounding piece sealing surface 70" on a tip surrounding piece 62", and a first mold component sealing surface 72" on a mold component 61". The first sealing surfaces 70" and 72" may be entirely inclined surfaces in the embodiment shown in FIG. 4, whereas they are shown as including an inclined portion and a substantially vertical portion in the embodiment shown in FIG. 3a. The first sealing surfaces 70" and 72" may also be referred to as the first and second gap seal surfaces 70" and 72" respectively.

Figure 5:
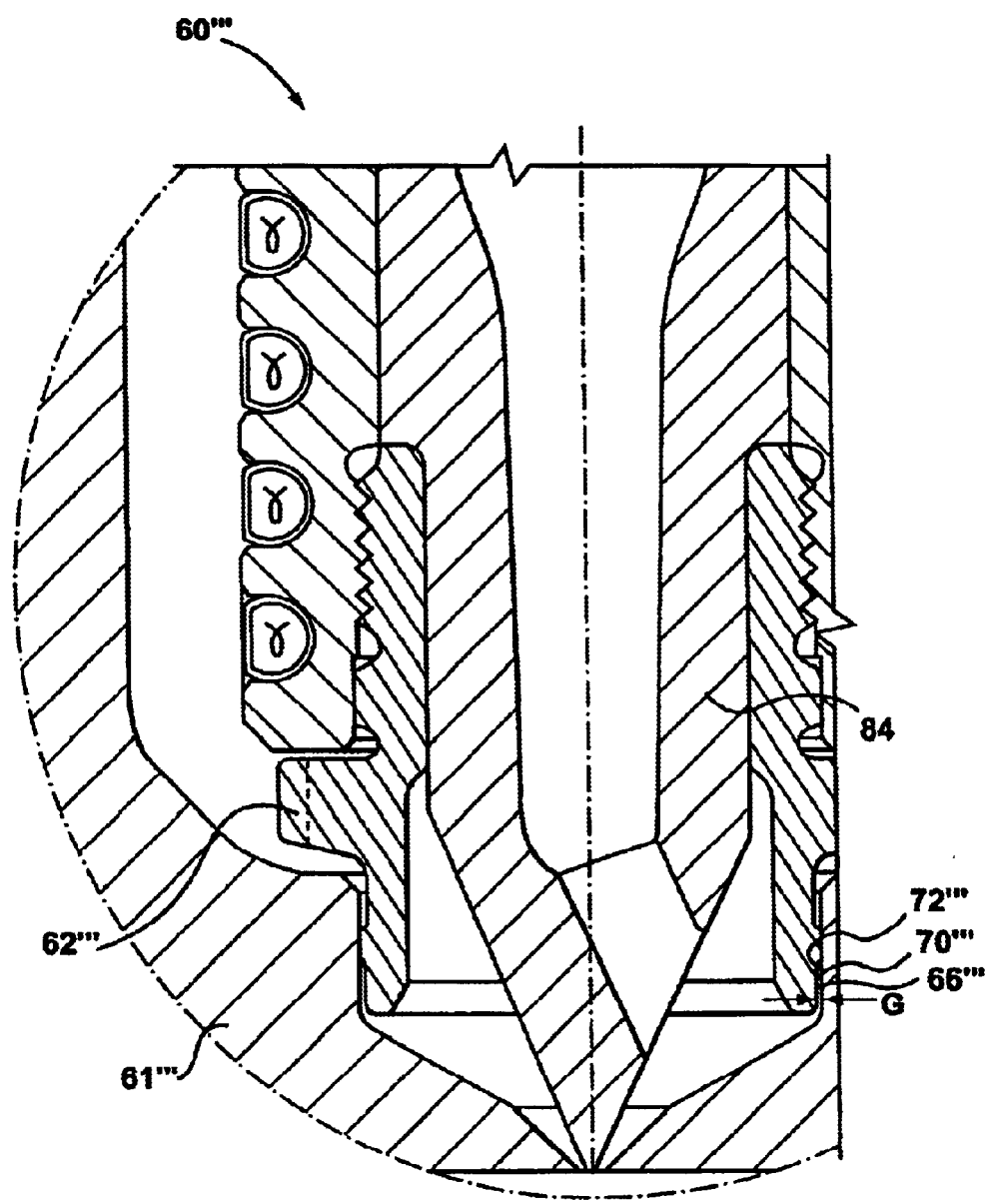
FIG. 5 is a sectional view of a portion of a nozzle in accordance with a fifth embodiment of the present invention.

Reference is made to FIG. 5, which shows yet another variant 60''' of the embodiment shown in FIG. 3a. In the variant shown in FIG. 5, the tip 84 replaces the tip 16 (FIG. 3a). The items shown in FIG. 5 are similar to those in FIG. 3a, except as follows. A gap seal 66''' is formed which is similar to the gap seal 66 (FIG. 3a), except that the gap seal 66''' is formed between a first tip surrounding piece sealing surface 70''' on a tip surrounding piece 62''', and a first mold component sealing surface 72''' on a mold component 61'''. The first sealing surfaces 70''' and 72''' may be substantially vertical surfaces in the embodiment shown in FIG. 5, whereas they are shown as including an inclined portion and a substantially vertical portion in the embodiment shown in FIG. 3a. The first sealing surfaces 70''' and 72''' may also be referred to as the first and second gap seal surfaces 70''' and 72''' respectively.

Figure 6:
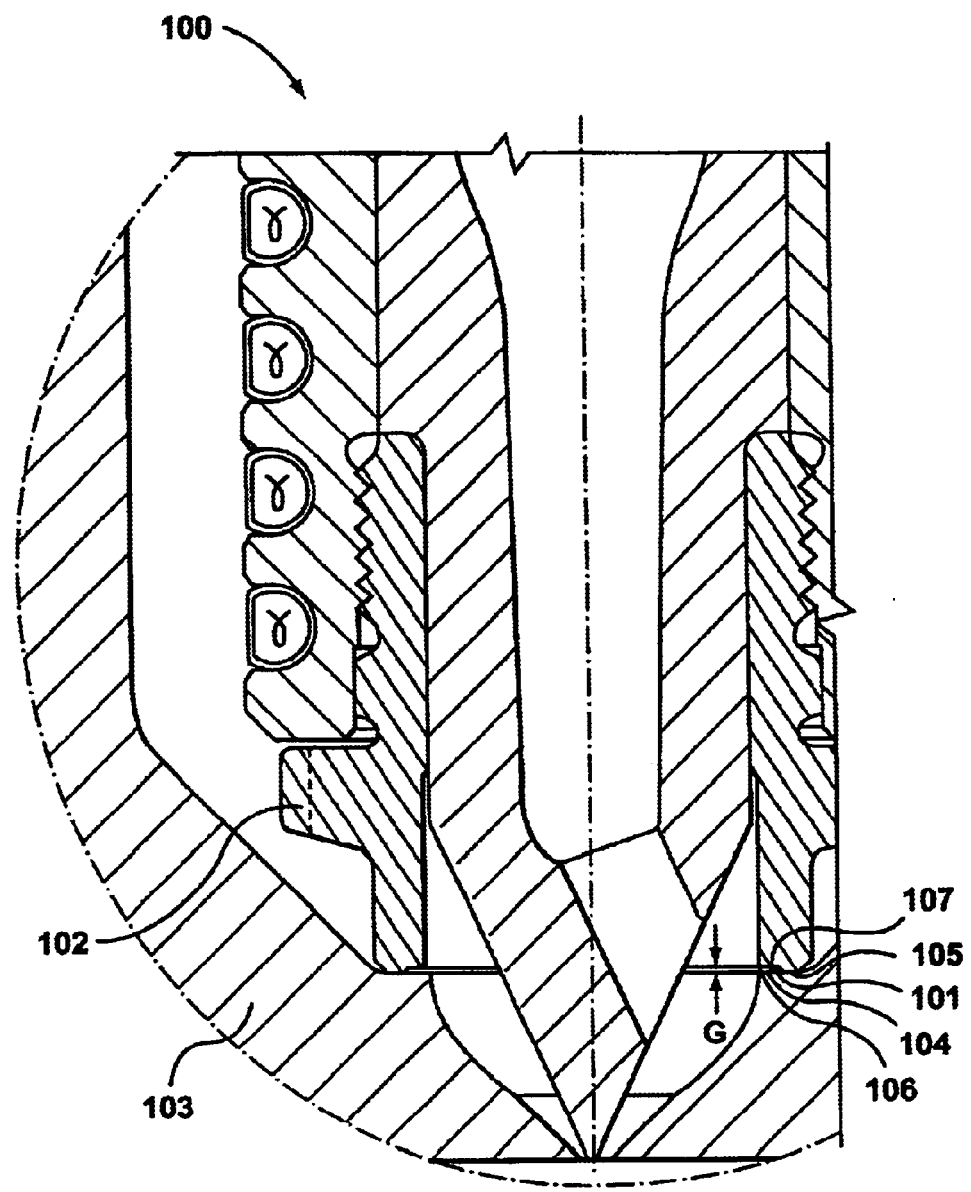
FIG. 6 is a sectional view of a portion of a nozzle in accordance with a sixth embodiment of the present invention.

Reference is made to FIG. 6, in which a nozzle 100 is shown in accordance with an alternative embodiment of the present invention. The nozzle 100 may be similar to the nozzle 60 (FIG. 3a), and may include a multi-portion seal 101 between a tip surrounding piece 102 and a mold component 103.

The multi-portion seal 101 includes a gap seal 104 and a second seal 105. The gap seal 101 is made by a first tip surrounding piece sealing surface 106 on the tip surrounding piece 102 cooperating with a first mold component sealing surface 107 on the mold component 103.

In this embodiment, the sealing surfaces 106 and 107 may be substantially horizontal as shown, and are separated by the gap G. The sealing surfaces 106 and 107 may also be referred to as the first and second gap seal surfaces 106 and 107 respectively. In this embodiment, a separate alignment means (not shown) may be included if desired.

It will be noted that the nozzle 100 may optionally not include the second seal 105, and have only the gap seal 101 with the mold component 103.

Figure 7:
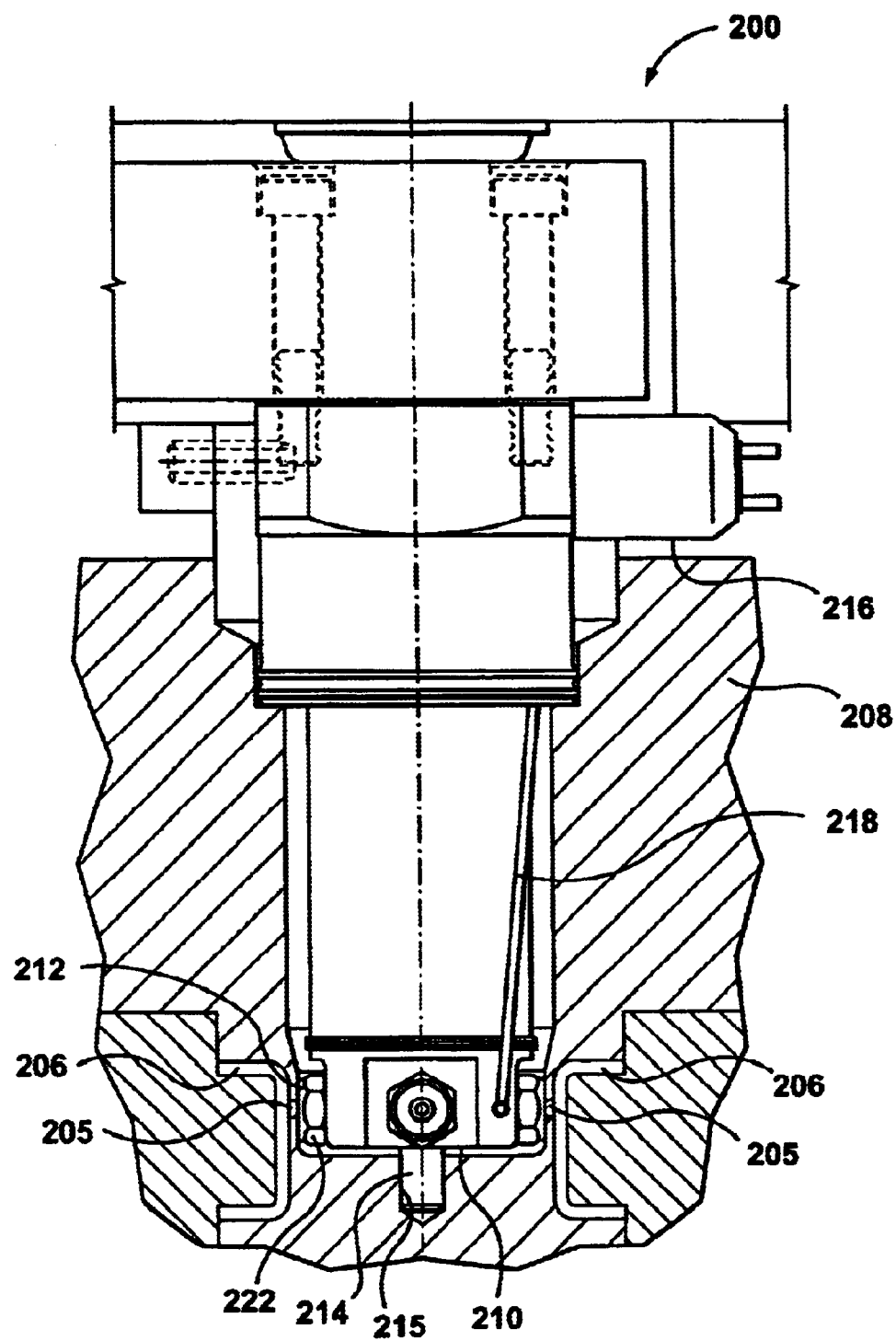
FIG. 7 is a side view of a nozzle in accordance with a seventh embodiment of the present invention.
Figure 8:
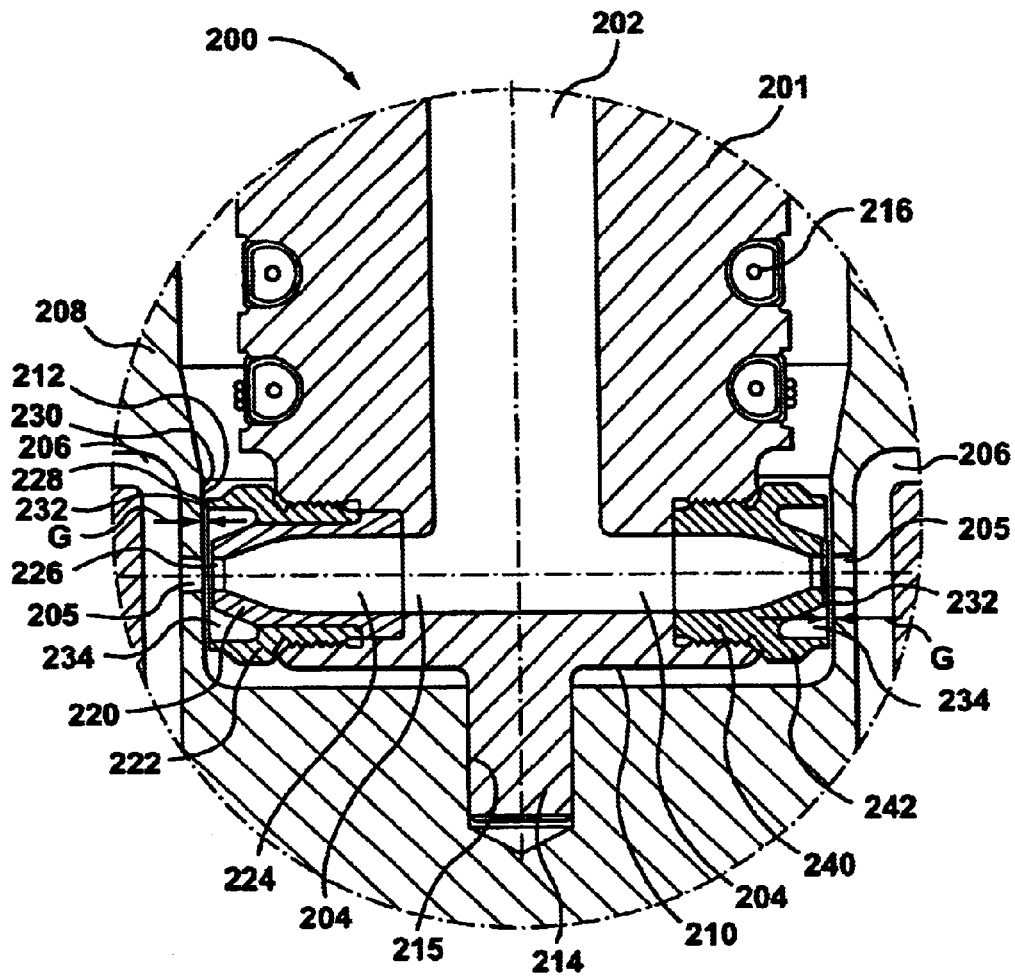
FIG. 8 is a sectional view of a portion of the nozzle shown in FIG. 7.

Reference is made to FIGS. 7 and 8, which show a nozzle 200. Nozzle 200 is similar to nozzle 10, but is an edge-gated nozzle. Nozzle 200 includes a nozzle body 201 having a nozzle melt passage 202, which divides into a plurality of the melt passage portions 204 (FIG. 8). Nozzle 200 is for feeding melt through a plurality of gates 205 into a plurality of mold cavities 206, in a mold component 208. Nozzle 200 has an end 210, which may be positioned in a bore 212 in the mold component 208, for transferring melt into the mold cavities 206. On the end 210 is mounted a guide piece 214. The guide piece 214 fits within a guide aperture 215 for aligning the end 210 of nozzle 200 in the bore 212. The nozzle 200 may include a heater 216 and a thermocouple 218 (FIG. 7).

Referring to FIG. 8, each nozzle melt passage portion 204 has therewith a nozzle tip 220 and a tip surrounding piece 222. The tip 220 and the tip surrounding piece 222 may mount to the nozzle body 201, in a similar manner to tip 16 and tip surrounding piece 18 to nozzle body 14 (FIG. 1). The tip 220 includes a tip melt passage 224 is in communication with a nozzle melt passage portion 204, and has an exit 226. The tip surrounding piece 222 may include a tip surrounding piece sealing surface 228 that surrounds exit 226 and gate 205, and is positioned at a gap G from a mold component sealing surface 230 on the mold component 208, forming a gap seal 232 therewith. A chamber 234 is defined between the tip 220 and the gate 205. The tip surrounding piece sealing surface 228 and the mold component sealing surface 230 may be referred to as the first and second gap seal surfaces 228 and 230 respectively.

Melt passes through nozzle melt passage 202, melt passage portions 204, tip melt passages 224, out from exits 226 into chambers 234, through gates 205 and into mold cavities 206. Melt is inhibited from escaping from chamber 234 by the gap seal 232.

Nozzle 200 may include an alternative tip 240 and tip surrounding piece 242 which are integrally joined, forming a single piece, instead of tip 220 and tip surrounding piece 222, or may include some of each type of tip and tip surrounding piece.

Figure 9:
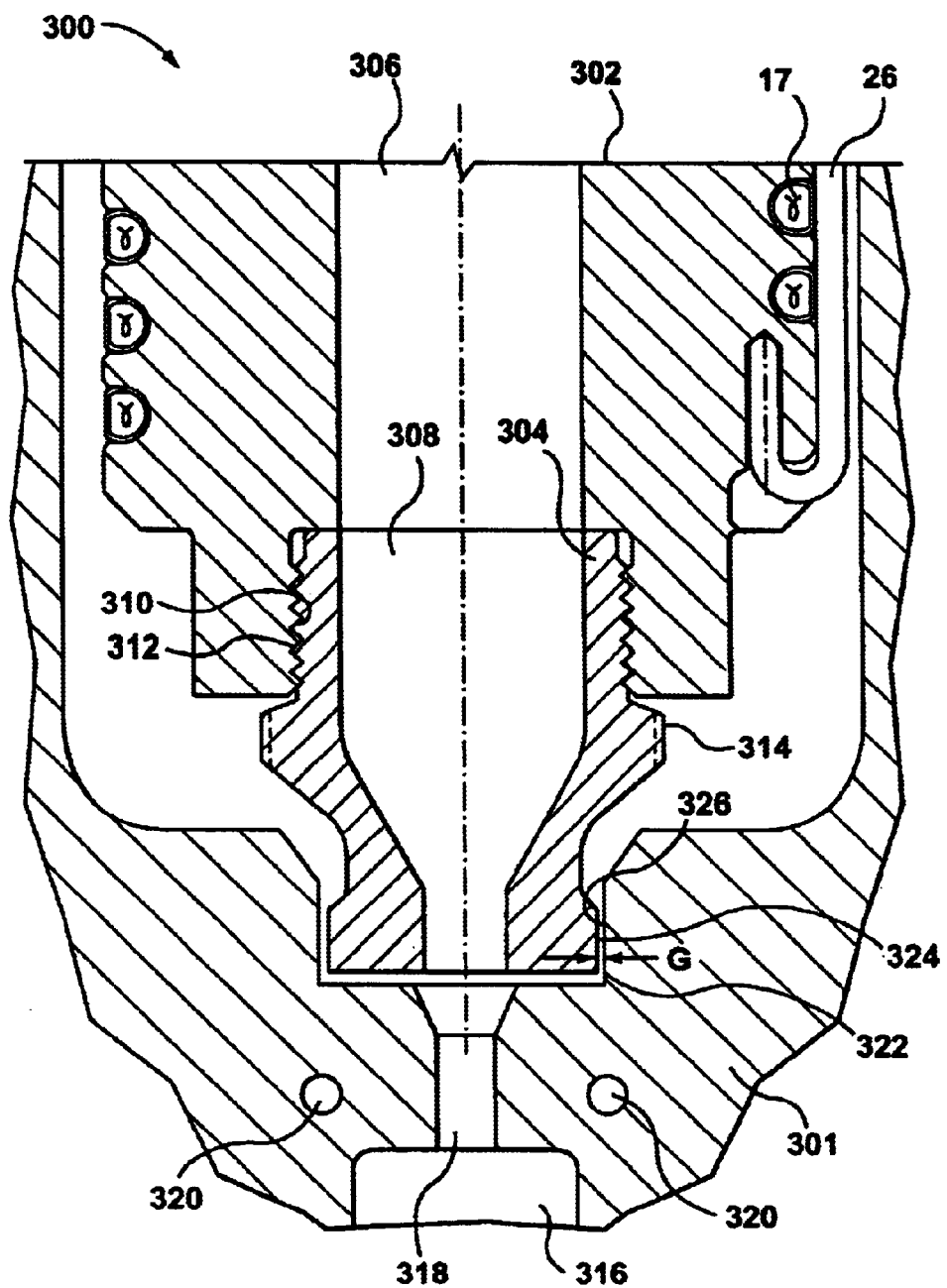
FIG. 9 is a sectional view of a portion of a nozzle in accordance with an eighth embodiment of the present invention.

Reference is made to FIG. 9, which shows a nozzle 300 in accordance with another embodiment of the present invention, in combination with a mold component 301. The nozzle 300 may be similar to nozzle 10 (FIG. 1), and includes a nozzle body 302, the heater 17, a tip 304 and may optionally include the thermocouple 26. The nozzle body 302 defines a nozzle body melt passage 306 therethrough. The heater 17 may be positioned on the nozzle body 302 in any suitable way, for heating melt in the nozzle body melt passage 306.

The tip 304 may be similar to the tip 16 (FIG. 1) and defines a tip melt passage 308 therethrough. The tip 304 may be removably connected to the nozzle body 302 in any suitable way, so that the tip melt passage 308 is in fluid communication with and downstream from the nozzle body melt passage 306. The tip 304 may, for example, have a tip threaded portion 310 for mating with a nozzle body threaded portion 312 on the nozzle body 302. The tip may further include a tip tool engagement portion 314 for receiving a tool (not shown), for the installation and removal of the tip 304 with respect to the nozzle body 302.

The mold component 301 defines a plurality of melt cavities 316, each of which has at least one gate 318 leading thereto. A plurality of cooling channels 320 may be included in the mold component 301 to cool melt in the mold cavities 316.

A gap seal 322 may be formed by the cooperation of the tip sealing surface 324 and a mold component sealing surface 326, which are separated by the gap G. The tip sealing surface 324 and the mold component sealing surface 326 may also be referred to as the first and second gap seal surfaces 324 and 326 respectively.

The tip can be manufactured by any of the materials that are used for the tip 16 (FIG. 1), however, it may be advantageous to use a material other than Tungsten Carbide, due to the existence of the threaded portion 310 on the tip 304.

Figure 10:
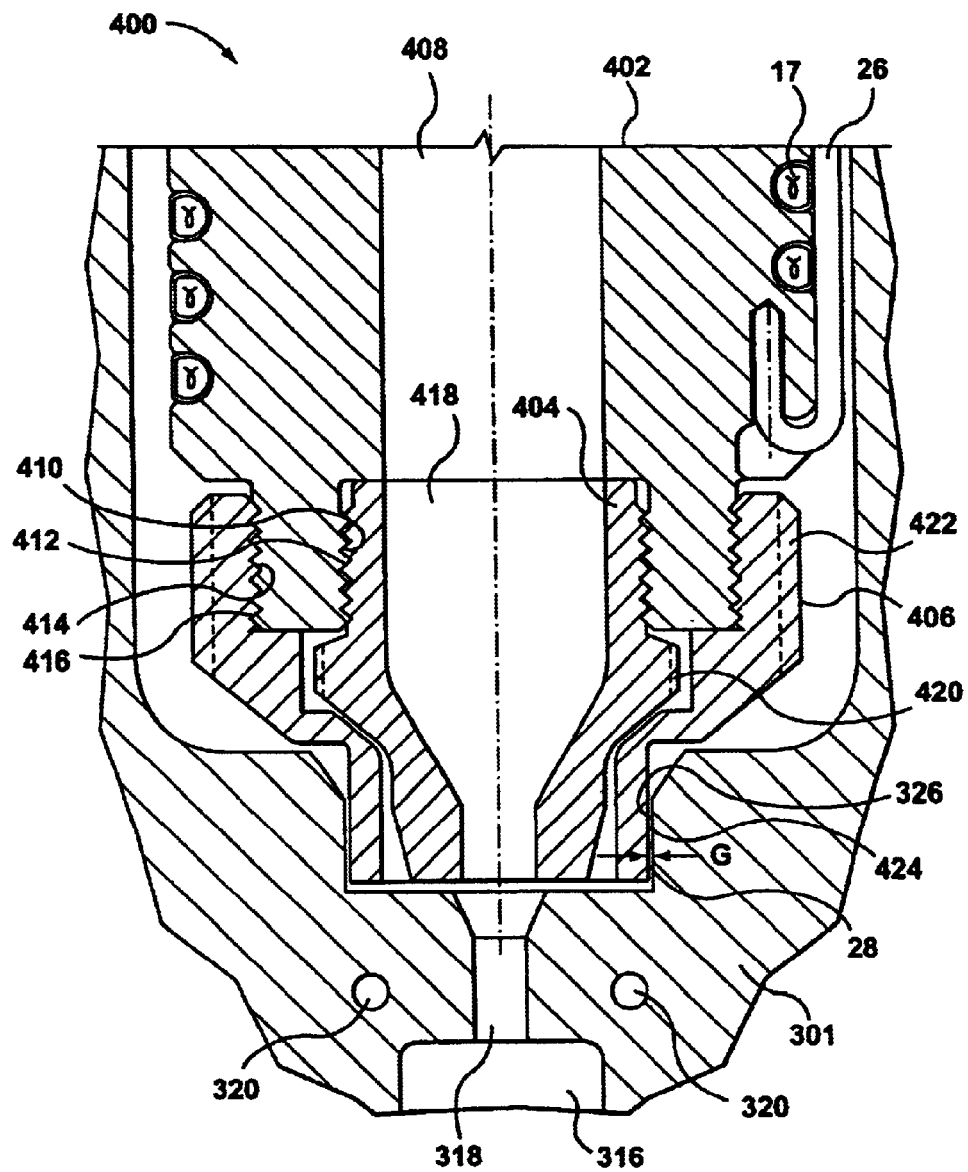
FIG. 10 is a sectional view of a portion of a nozzle in accordance with a ninth embodiment of the present invention.

Reference is made to FIG. 10, which shows a nozzle 400 in accordance with another embodiment of the present invention, in combination with the mold component 301. The nozzle 400 may be similar to the nozzle 300 and includes a nozzle body 402, the heater 17, a tip 404, a tip surrounding piece 406 and may optionally include the thermocouple 26. The nozzle body 402 may be similar to the nozzle body 302 (FIG. 9), and defines a nozzle body melt passage 408 therethrough. The nozzle body 402 also includes a first nozzle body threaded portion 410 for mating with a tip threaded portion 412 on the tip 404. The nozzle body 402 also includes a second nozzle body threaded portion 414 for mating with a tip surrounding piece threaded portion 416 on the tip surrounding piece 406. The tip 404 may be similar to the tip 304 and defines a melt passage 418 therethrough. The tip 404 may also include a tip tool engagement portion 420 for receiving a tool (not shown). In the embodiment shown in FIG. 10, the tip 404 is removably connected to the nozzle body 402 by means of the cooperation of threaded portions 416 and 410.

The tip surrounding piece 406 may be similar to the tip surrounding piece 18 (FIG. 1), except that the threaded portion 414 on the tip surrounding piece 406 may be an internally threaded portion, instead of an externally threaded portion, and except that the tip surrounding piece 406 does not retain the tip 404 in place.

The tip surrounding piece 406 may include a tip surrounding piece tool engagement portion 422 for receiving a tool (not shown).

The tip surrounding piece 406 has a tip surrounding piece sealing surface 424, which cooperates with the mold component sealing surface 326 to form a gap seal 428 therewith. The sealing surfaces 424 and 326 are separated by the gap G, which inhibits melt leakage therebetween. The sealing surfaces 424 and 326 may also be referred to as the first and second gap seal surfaces 424 and 326 respectively.

Figure 11:
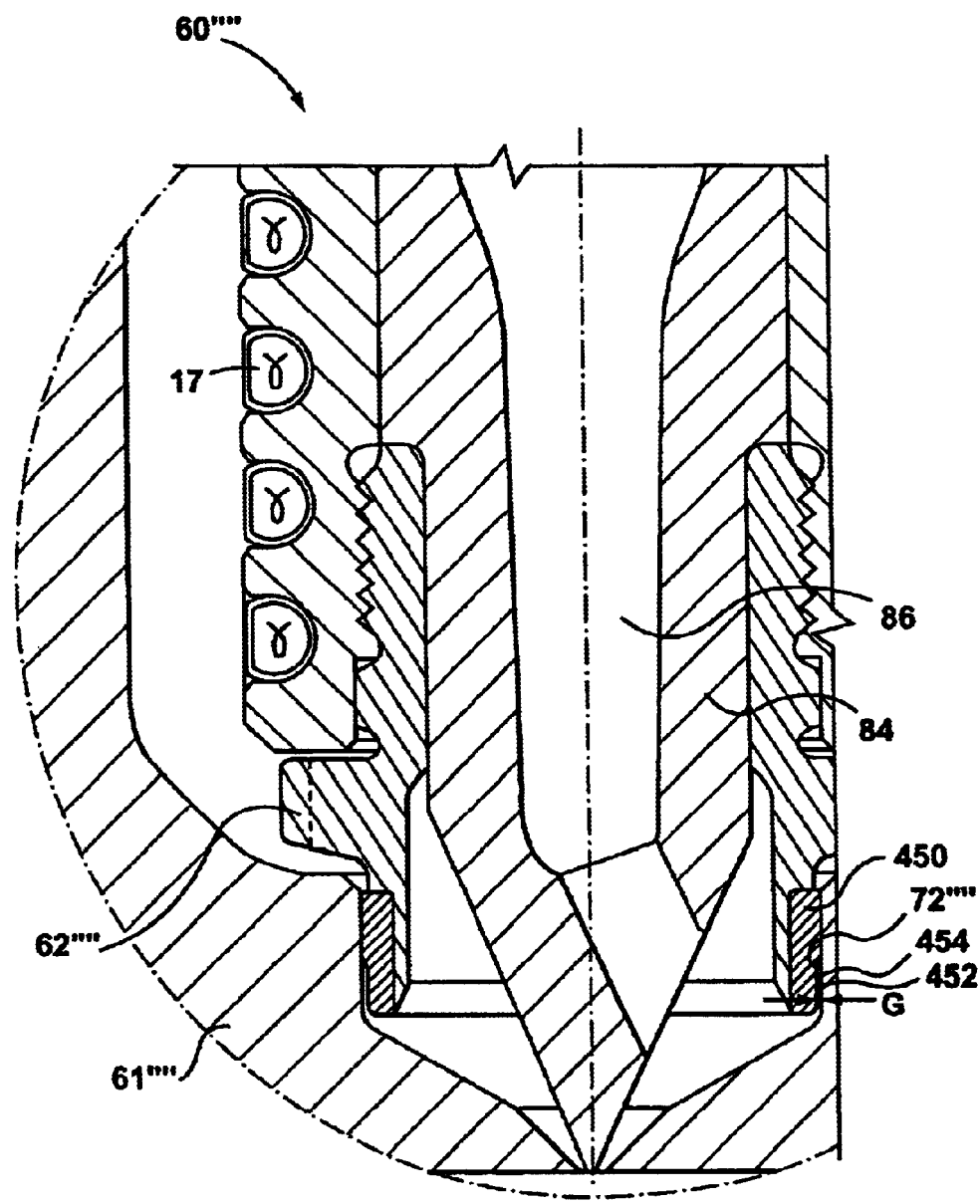
FIG. 11 is a sectional view of a portion of a nozzle in accordance with a tenth embodiment of the present invention.

Reference is made to FIG. 11, which shows a nozzle 60"", in combination with a mold component 61"", in accordance with a variant of the nozzle 60'" and mold component 61'" shown in FIG. 5. The nozzle 60"" may be similar to the nozzle 60'" with the exception that a tip surrounding piece 62"" on the nozzle 60"" includes a seal piece 450 thereon. The seal piece 450 may be a band that surrounds the outer surface of the tip surrounding piece 62"", and forms a gap seal 452 with the mold component 61"". The seal piece 450 has a sealing surface before that mates with mold component sealing surface 72"" to form the gap seal 452. The sealing surfaces 454 and 72"" are separated by the gap G, which inhibits melt leakage therepast. The sealing surfaces 454 and 72"" may also referred to as the first and second gap seal surfaces 454 and 72"" respectively.

The seal piece 450 may be made from a material that has a lower thermal conductivity than that of the tip surrounding piece 62"". The seal piece 450 may, for example, be made from titanium, H13, stainless steel, mold steel or chrome steel. Other alternative materials include ceramics and plastics. The seal piece 450 may, instead of being a separate piece that is joined to the tip surrounding piece 62"", be a coating or layer that is applied to a portion of the outside surface of the tip surrounding piece 62"".

The tip surrounding piece 62"" may be positioned, at least in part, between the heater and the tip melt passage 86. It may be advantageous in the case shown in FIG. 11, for the tip surrounding piece 62"" to be made from a material that is generally equally thermally conductive as the material of the tip 84. The seal piece 450 reduces the heat transfer between the tip surrounding piece 62"" and the mold component 61"", by being made from a material that has a lower thermal conductivity than that of the tip surrounding piece 62"".

Figure 12:
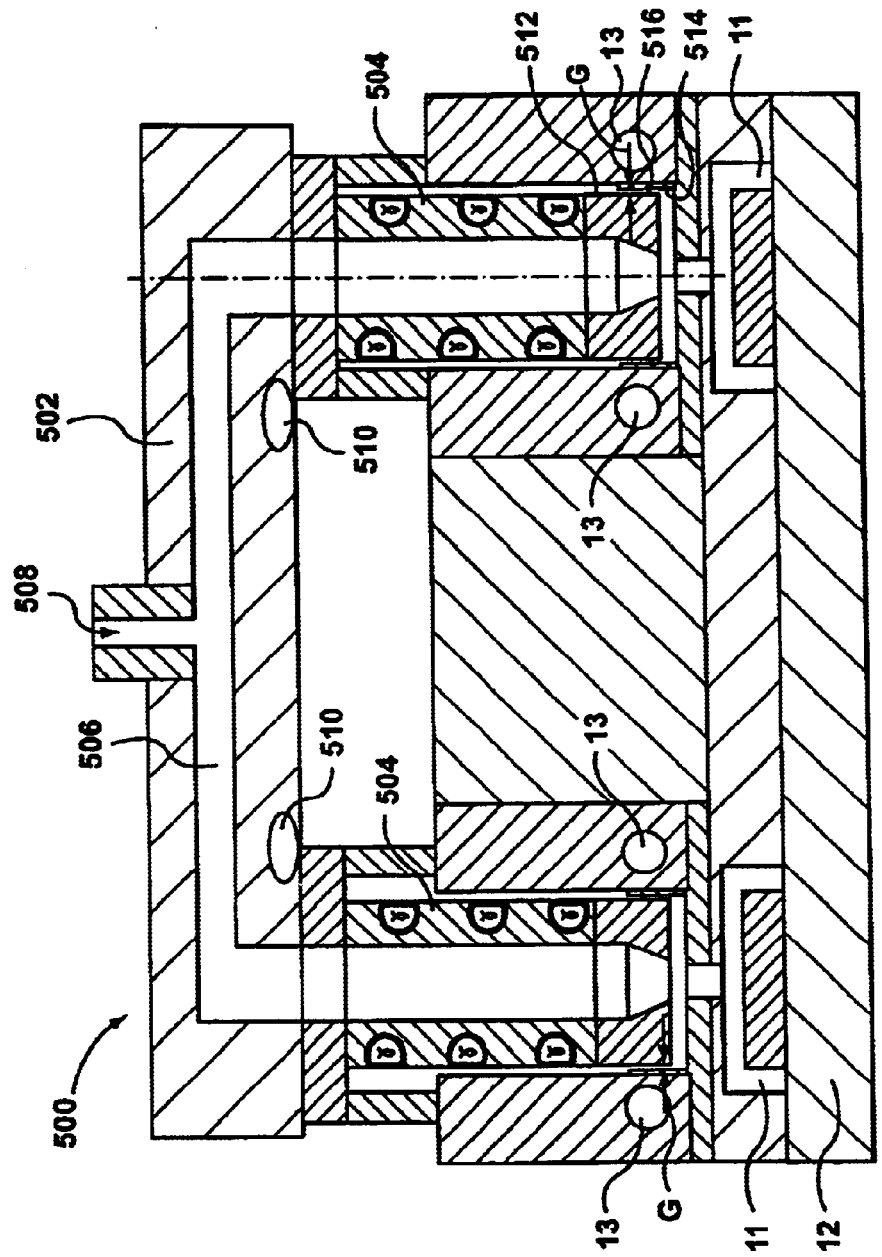
FIG. 12 is a sectional view of an injection molding apparatus incorporating a nozzle in accordance with an eleventh embodiment of the present invention.

Reference is made to FIG. 12, which shows an injection molding apparatus 500, that includes a runner component 502, the mold component 12 and a plurality of nozzles 504 in accordance with the present invention.

The runner component 502 includes a plurality of runners 506 which transfer melt from a main runner inlet 508 to the nozzles 504. The runner component 502 may be heated by a heater 510.

The nozzles 504 transfer melt from the runner component 502 to the mold component 12. The nozzles 504 may be any of the nozzle embodiments and variants described above and shown in FIGS. 1–11, and include a nozzle sealing surface 512 that is separated from a mold component sealing surface 514 by the gap G to form a gap seal 516 therewith. The nozzle sealing surface 512 and the mold component sealing surface 514 may also be referred to as the first and second gap seal surfaces 512 and 514 respectively. The nozzle sealing surface 512 may be positioned on any suitable portion or component of the nozzle 504.

A particular example of an injection molding apparatus is shown in FIG. 12. It will be appreciated that the injection molding apparatus that incorporates the gap seal of the present invention may be any suitable type of injection molding apparatus and is not limited to the example shown.

It will be appreciated that the first and second gap seal surfaces that make up the gap seal of the present invention, may be surfaces on any component of the nozzle and mold component respectively, and are not limited to the examples shown and described herein. For greater certainty, the first gap seal surface may be positioned on any suitable structure that is part of the nozzle, and is therefore connected at least indirectly to the nozzle body.

Thermal expansion and contraction during a molding cycle must be considered during the construction of the nozzles described above, so that the gap G is within the ranges given above when the nozzle feeds melt into the gate.

It will be appreciated that it may be advantageous to size the gap G so as to reduce to a desired level, the amount of heat lost from the nozzle.

It will be appreciated that the particular configuration of the gap seal portion may be selected depending on the specific molding application, including the rheological properties of the melt, such as its viscosity at the injection temperature. It is contemplated that the invention can be applied to nozzles with types of melt other than those types of melt specifically disclosed herein.

While the above description constitutes the preferred embodiments, it will be appreciated that the present invention is susceptible to modification and change without departing from the fair meaning of the accompanying claims.

What is claimed is:

1. A nozzle for an injection molding apparatus, comprising:
 a nozzle body, said nozzle body defining a nozzle body melt passage, wherein said nozzle body melt passage is adapted to be downstream from and in fluid communication with a melt source, and said nozzle body melt passage is adapted to be upstream from and in fluid communication with a gate into a mold cavity in a mold component;
 a heater that is thermally connected to said nozzle body for heating melt in said nozzle body melt passage; and
 a first gap seal surface positioned on a structure that is connected at least indirectly to said nozzle body, wherein said first gap seal surface is adapted to be separated by a gap with respect to a second gap seal surface on the mold component, wherein said gap is sized to inhibit the flow of melt between said first gap seal surface and said second gap seal surface.

2. A nozzle as claimed in claim 1, wherein said gap is sized in relation to the temperature of the melt, and the viscosity of the melt intended to flow through the nozzle.

3. A nozzle as claimed in claim 1, wherein, when said first gap seal surface and said second gap seal surface are separated by said gap, an air space is defined between said first gap seal surface and said second gap seat surface, and said air space is adapted to insulate said nozzle against heat loss.

4. A nozzle as claimed in claim 1, further comprising a first supplementary seal surface positioned on a structure that is connected at least indirectly to said nozzle body, wherein said first supplementary seal surface is positioned adjacent said first gap seal surface and is adapted to cooperate with a second supplementary seal surface on the mold component to form a supplementary seal in addition to said gap seal.

5. A nozzle as claimed in claim 1, further comprising a tip, said tip defining a tip melt passage that is downstream from and in communication with said nozzle body melt passage, and said tip melt passage is upstream from said gate.

6. A nozzle as claimed in claim 5, wherein said first gap seal surface is positioned on said tip.

7. A nozzle as claimed in claim 5, further comprising a tip surrounding piece, wherein said tip surrounding piece is adapted to be positioned closer to said mold component than said tip.

8. A nozzle as claimed in claim 7, wherein said first gap seal surface is positioned on said tip surrounding piece.

9. A nozzle as claimed in claim 7, further comprising a seal piece positioned on said tip surrounding piece, wherein said first gap seal surface is positioned on said seal piece.

10. A nozzle as claimed in claim 7, wherein said tip surrounding piece retains said tip in place.

11. A nozzle as claimed in claim 7, wherein said tip surrounding piece is removably connected with respect to said nozzle body.

12. A nozzle as claimed in claim 5, wherein said tip is removably connected with respect to said nozzle body.

13. A nozzle as claimed in claim 7, wherein said tip is removably connected with respect to said nozzle body.

14. A nozzle as claimed in claim 1, further comprising an alignment piece that is connected at least indirectly to said nozzle body and is adapted to align said nozzle with respect to said gate.

15. A nozzle as claimed in claim 14, wherein the material of said alignment piece has a lower thermal conductivity than the thermal conductivity of the material of the component of the nozzle with which said alignment piece is in contact.

16. A nozzle as claimed in claim 7, wherein said tip surrounding piece is made from a material that is less thermally conductive than the material of said tip.

17. A nozzle as claimed in claim 7, wherein said tip surrounding piece is made from a material that has a thermal conductivity that is generally similar to the thermal conductivity of said tip.

18. A nozzle as claimed in claim 9, wherein the material of said seal piece has a thermal conductivity that is lower than the thermal conductivity of the material of said tip surrounding piece.

19. A nozzle as claimed in claim 7, wherein said tip surrounding piece is adapted to cooperate with said mold component to align said nozzle with respect to said gate.

20. A nozzle as claimed in claim 1, wherein said gap is less than approximately 0.07 mm.

21. A nozzle as claimed in claim 4, wherein said gap is approximately 0.15 mm.

22. A nozzle as claimed in claim 4, wherein said gap is less than approximately 0.25 mm.

23. An injection molding apparatus, comprising:

a mold component and at least one nozzle;

wherein said at least one nozzle includes a nozzle body, said nozzle body defining a nozzle body melt passage, wherein said nozzle body melt passage is adapted to be downstream from and in fluid communication with a melt source, and said nozzle body melt passage is adapted to be upstream from and in fluid communication with a gate into a mold cavity in a mold component, wherein said at least one nozzle includes a heater that is thermally connected to said nozzle body for heating melt in said nozzle body melt passage, wherein said at least one nozzle includes a first gap seal surface positioned on a structure that is connected at least indirectly to said nozzle body, wherein said mold component defines a mold cavity end a gate into said mold cavity, wherein said mold component includes a second gap seal surface thereon, and wherein said first gap seal surface is separated by a gap with respect to said second gap seal surface, wherein said gap is sized to inhibit the flow of melt between said first gap seal surface and said second gap seal surface.

24. An injection molding apparatus as claimed in claim 23, wherein said gap is sized in relation to the temperature of the melt, and the viscosity of the melt intended to flow through the nozzle.

25. An injection molding apparatus as claimed in claim 23, wherein, when said first gap seal surface and said second gap seal surface are separated by said gap, air space is defined between said first gap seal surface and said second gap seal surface, and said air space is adapted to insulate said nozzle against heat loss.

26. An injection molding apparatus as claimed in claim 23, further comprising a first supplementary seat surface positioned on a structure that is connected at least indirectly to said nozzle body, and a second supplementary seal surface positioned on said mold component, wherein said first supplementary seal surface is positioned adjacent said first gap seat surface and is adapted to cooperate with said second supplementary seal surface to form a supplementary seal in addition to said gap seal.

27. An injection molding apparatus as claimed in claim 23, further comprising a tip, said tip defining a tip melt passage that is downstream from and in communication with said nozzle body melt passage, and said tip melt passage is upstream from said gate.

28. An injection molding apparatus as claimed in claim 27, wherein said first gap seal surface is positioned on said tip.

29. An injection molding apparatus as claimed in claim 27, further comprising a tip surrounding piece, wherein said tip surrounding piece is adapted to be positioned closer to said mold component than said tip.

30. An injection molding apparatus as claimed in claim 29, wherein said first gap seal surface is positioned on said tip surrounding piece.

31. An injection molding apparatus as claimed in claim 29, further comprising a seal piece positioned on said tip surrounding piece, wherein said first gap seal surface is positioned on said seal piece.

32. An injection molding apparatus as claimed in claim 29, wherein said tip surrounding piece retains said tip in place.

33. An injection molding apparatus as claimed in claim 29, wherein said tip surrounding piece is removably connected with respect to said nozzle body.

34. An injection molding apparatus as claimed in claim 27, wherein said tip is removably connected with respect to said nozzle body.

35. An injection molding apparatus as claimed in claim 29, wherein said tip is removably connected with respect to said nozzle body.

36. An injection molding apparatus as claimed in claim 23, further comprising an alignment piece that is connected at least indirectly to said nozzle body and is adapted to align said nozzle with respect to said gate.

37. An injection molding apparatus as claimed in claim 36, wherein the material of said alignment piece has a lower thermal conductivity than the thermal conductivity of the material of the component of the nozzle with which said alignment piece is in contact.

38. An injection molding apparatus as claimed in claim 29, wherein said tip surrounding piece is made from a material that is less thermally conductive than the material of said tip.

39. An injection of molding apparatus as claimed in claim 29, wherein said tip surrounding piece is made from a material that has a thermal conductivity that is generally similar to the thermal conductivity of said tip.

40. An injection molding apparatus as claimed in claim 31, wherein the material of said seal piece has a thermal conductivity that is lower than the thermal conductivity of the material of said tip surrounding piece.

41. An injection molding apparatus as claimed in claim 29, wherein said tip surrounding piece is adapted to cooperate with said mold component to align said nozzle with respect to said gate.

42. An injection molding apparatus as claimed in claim 23, wherein said gap is less than approximately 0.07 mm.

43. An injection molding apparatus as claimed in claim 26, wherein said gap is approximately 0.15 mm.

44. An injection molding apparatus as claimed in claim 26, wherein said gap is less than approximately 0.25 mm.

* * * * *

UNITED STATES PATENT AND TRADEMARK OFFICE
CERTIFICATE OF CORRECTION

PATENT NO.      : 6,869,276 B2
DATED           : March 22, 2005
INVENTOR(S)     : Babin et al.

It is certified that error appears in the above-identified patent and that said Letters Patent is hereby corrected as shown below:

Title page,
Item [56], References Cited, U.S. PATENT DOCUMENTS, add the following:

| | | |
|---|---|---|
| -- 3,677,682 | 7/1972 | Putkowski |
| 4,312,630 | 1/1982 | Travaglini |
| 4,781,572 | 11/1988 | Boring |
| 4,787,836 | 11/1988 | Osuna-Diaz et al. |
| 5,139,724 | 8/1992 | Hofstetter et al. |
| 5,141,696 | 8/1992 | Osuna-Diaz |
| 5,254,305 | 10/1993 | Fernandez et al. |
| 5,269,677 | 12/1993 | Gauler |
| 5,360,333 | 11/1994 | Schmidt |
| 5,804,228 | 9/1998 | Kofsman et al. |
| 5,811,140 | 9/1998 | Manner |
| 5,871,785 | 2/1999 | Van Boekel |
| 5,871,786 | 2/1999 | Hume et al. |
| 5,980,234 | 11/1999 | Harley |
| 6,143,358 | 11/2000 | Singh et al. |
| 6,227,461 | 5/2001 | Schroeder et al. |
| 6,315,549 | 11/2001 | Jenko et al. |
| 6,533,571 | 3/2003 | Fikani |
| 6,609,902 | 8/2003 | Blais et al. |
| 2003/0211199 | 11/2003 | Eigler et al. --. |

Drawings,
FIG. 4, delete "66" and replace with -- 66" --.
FIG. 10, delete "28" and replace with -- 428 --.

Column 2,
Line 9, delete "FIG. 2" and replace with -- FIG. 3a --.

Column 3,
Line 60, insert -- . -- after "53".

Column 4,
Line 3, delete "tip" and replace with -- mold component --;
Line 5, delete "it" and replace with -- is --;
Line 21, delete "49" and replace with -- 54 --;
Line 55, delete "10" and replace with -- 14 --.

UNITED STATES PATENT AND TRADEMARK OFFICE
CERTIFICATE OF CORRECTION

PATENT NO. : 6,869,276 B2
DATED : March 22, 2005
INVENTOR(S) : Babin et al.

It is certified that error appears in the above-identified patent and that said Letters Patent is hereby corrected as shown below:

Column 5,
Line 56, delete "10" and replace with -- 60 --.

Column 8,
Line 9, insert -- (FIG. 9) -- after "300";
Line 19, insert -- tip -- between "a" and "melt";
Line 19, insert -- way -- after "passage";
Line 24, delete "416" and replace with -- 412 --;
Line 55, insert -- be -- after "also".

Column 10,
Line 19, delete "seat" and replace with -- seal --.

Column 11,
Line 33, delete "end" and replace with -- and --;
Line 52, delete "seat" and replace with -- seal --;
Line 57, delete "seat" and replace with -- seal --.

Column 12,
Line 43, delete "of".

Signed and Sealed this

Fourth Day of October, 2005

JON W. DUDAS
*Director of the United States Patent and Trademark Office*